INVENTOR
Laurent J. FONTAINE

Robert B. Harmon
AGENT

INVENTOR
Laurent J. FONTAINE
Robert B. Harmon
AGENT

INVENTOR
Laurent J. FONTAINE
Robert B. Harmon
AGENT

INVENTOR
Laurent J. FONTAINE
Robert B. Harmon
AGENT 3,430,009

SERVICE OBSERVING SYSTEM

Laurent J. Fontaine, Pierrefonds, Quebec, Canada, assignor to Bell Telephone Company of Canada, Montreal, Quebec, Canada, a corporation of Canada Continuation of application Ser. No. 268,160, Mar. 26, 1963. This application Oct. 22, 1965, Ser. No. 507,615
U.S. Cl. 179—175.1 22 Claims
Int. Cl. H04m *5/00*; H01j *39/12*

This invention relates to a telephone service observing system and more particularly to such a system, employing transistors, for determining the volume of transmission.

This application is a continuation of my application Ser. No. 268,160, filed Mar. 26, 1963, now abandoned.

In order to measure complex waves encountered in telephone transmission circuits, it has been the general practice to employ a level meter with special dynamic characteristics. To read this meter the human element is required, skill and judgment, which vary with the different observers.

An object of this invention is to provide a service observing system which facilitates the reading of the meter.

A further object of this invention is to provide a service observing system having the foregoing properties, having means to determine at a glance any deviation from the normal transmission.

Another object of the invention is to provide a service observing system having the foregoing properties having visible means to automatically differentiate between the intensities of transmission.

A still further object of this invention is to provide a service observing system having the foregoing properties which is fast reading so that the fluctuations of the wave form can be followed continuously.

These and other objects of this invention are attained by providing a service observing system consisting in combination of a standard volume unit (V.U.) meter having two pairs of windows and one pair of balanced bridge circuits having a photoconductor device associated with each two of the arms of each bridge circuit. The light from one of the windows forms the reference background for the light from another of the windows, shaded by a light shutter deflected by the operation of the meter, so that as the shutter passes from one zone to another the pulse derived is counted within a predetermined time. The characteristic of the transmission is thus obtained depending on the zone in which the light shutter is present.

A better understanding of the invention may be attained by referring to the following description, taken in conjunction with the drawing, in which like numbers refer to like parts, in which.

Figure 1:
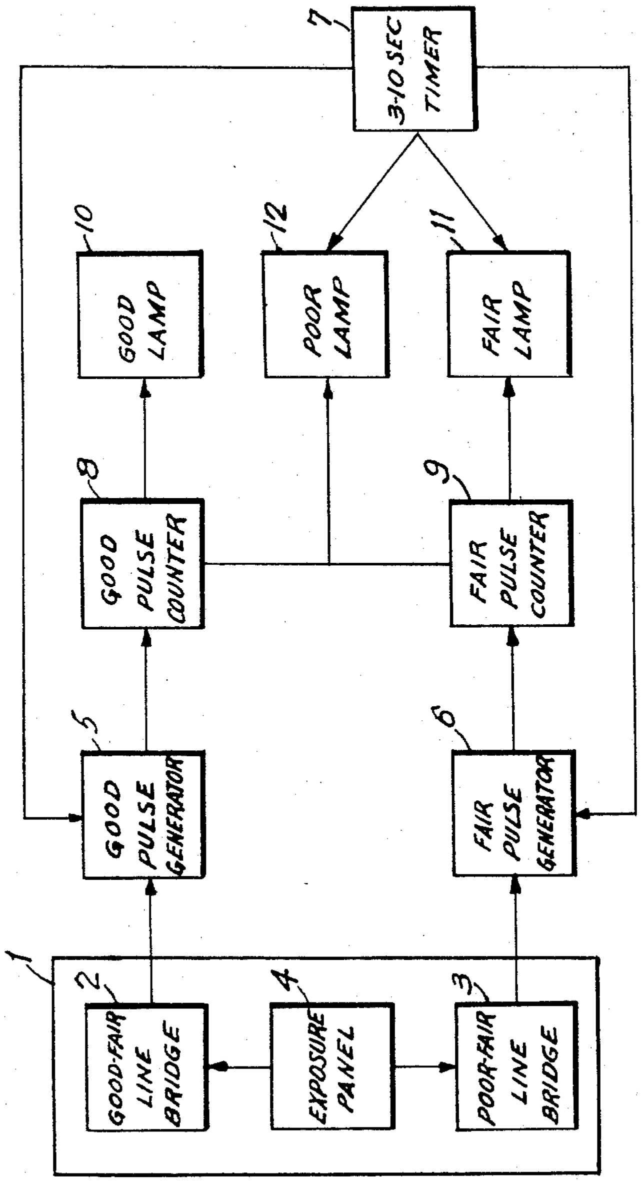
FIG. 1 illustrates a block circuit diagram showing the elements and connections employed in the service observing system of the invention.

Considering the drawings, there is shown in FIG. 1 a V.U. meter 1 containing a good-fair bridge circuit 2 and a poor-fair bridge 3 and a dial or exposure panel 4. Also shown are good pulse and fair pulse generators 5, 6 individual to the bridge circuits 2, 3 respectively. Connected to the generators 5, 6 is the timer 7. The generators 5, 6 are connected to the good and fair pulse counters 8, 9 respectively, while the pulse counters 8, 9 are connected to the good, fair and poor lamp circuits 10, 11, 12. The timer 7 is also connected to the fair and poor lamp circuits 11, 12.

Figure 2:
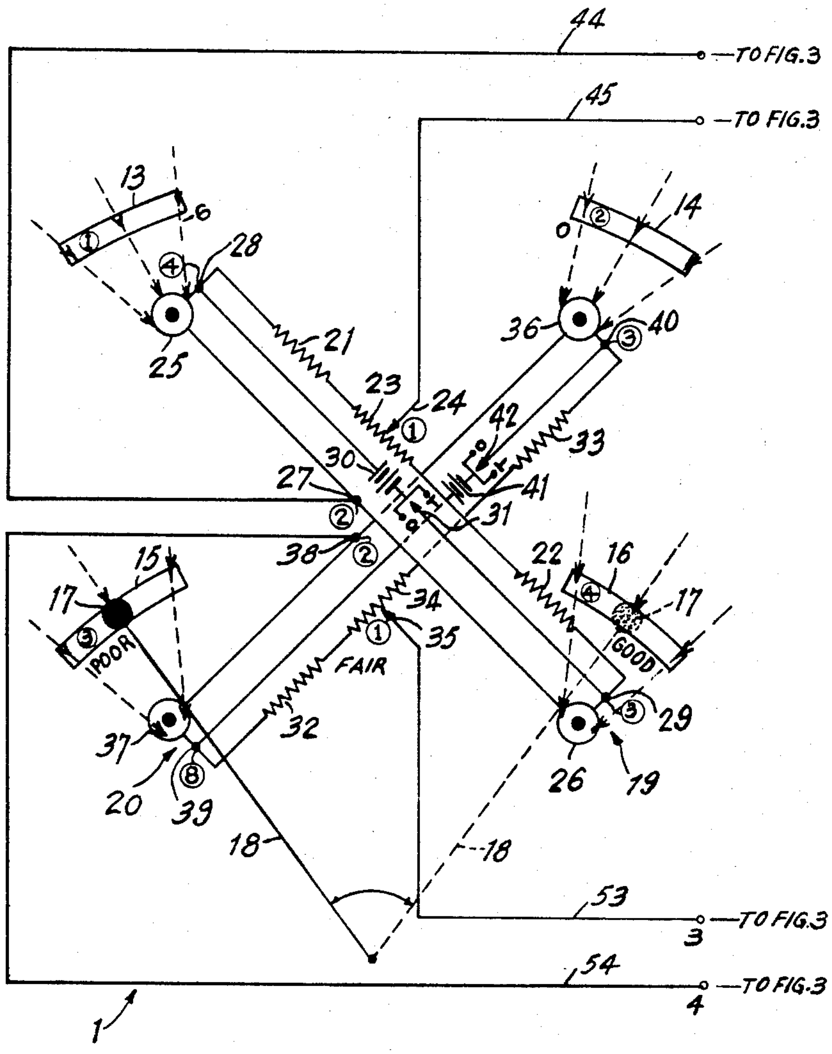
FIG. 2 illustrates the schematic of the V.U. meter equipped with photoconductive cells employed in the service observing system of the invention.

Considering the drawings in detail, there is contained on the meter panel 4, FIG. 2, identical light transparent windows 13, 14, 15, 16. Also shown is shutter 17 slidable over the windows 15, 16 for changing the relation between the measured light, from the first and second windows 13, 14 and the portion of the light from the windows 16, 15, respectively, which is obtained by the action of the needle movable member 18 deflected by the action of the meter 1.

Also contained within the meter are four point four arms bridge circuits 19, 20 individual to the windows 13, 16, 14, 15, respectively. Bridge circuit 19 includes resistors 21, 22, 23, the slidable contact 24 in cooperative relation with resistor 23 joined together, in serial relation. Bridge circuit 19 also includes photoconductive devices 25, 26 the inner ends joined together, in serial relation, to form a junction point 27. The outer ends of resistor 21, photoconductive device 25 and resistor 22 and photoconductive device 26 are joined together to form the junction points 28, 29, respectively. The bridge 19 is energized by the energy source 30 connected between switch 31, having contacts O and T, and junction points 28, 29.

Bridge circuit 20, which is identical to bridge circuit 19, consists of resistors 32, 33, 34 the inner ends joined together in serial relation, slidable contact 35, photoconductive devices 36, 37 the inner ends joined together, in serial relation to form a junction point 38, the outer ends of resistor 32, photoconductive device 37 and resistor 33 and photoconductive device 36 being joined together to form the junction points 39, 40 respectively. The bridge circuit is energized from energy source 41 connected between switch 42, having contacts O and T, and the junction points 39, 40.

Figures 3, 4, 5:
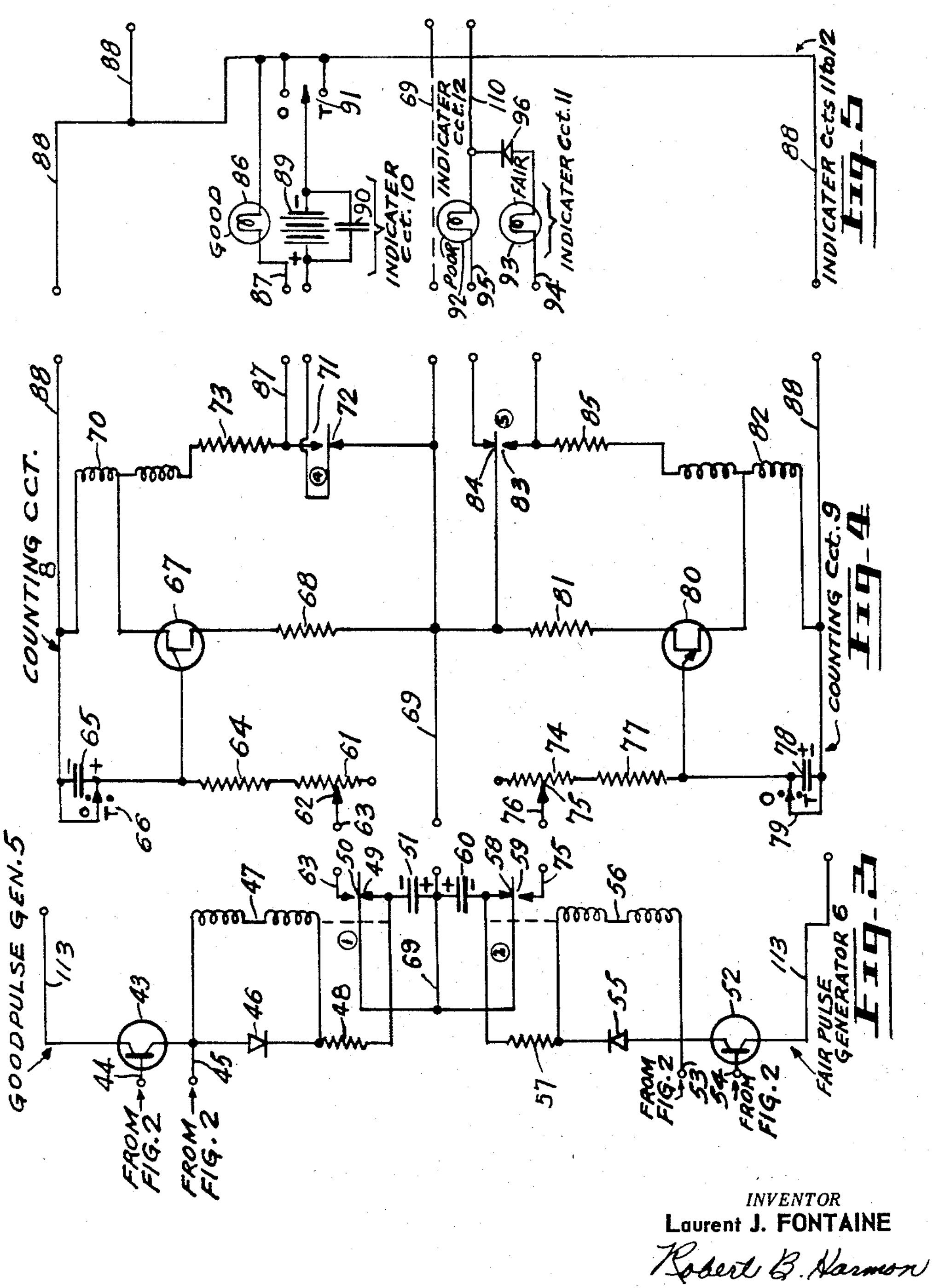
FIG. 3 illustrates the circuit schematic of the pulse generator circuit employed in the service observing system of the invention.
FIG. 4 illustrates the circuit schematic of the counting circuits employed in the service observing system of the invention.
FIG. 5 illustrates a circuit schematic of the indicating circuit employed in the service observing system of the invention.

In the pulse generator circuits 5 and 6, FIG. 3, there is shown in pulse generator circuit 5 transistor 43 having the base and emitter electrodes connected to the slidable contact 23 and the junction point 27 of bridge circuit 19, FIG. 2, by conductors 44, 45, respectively. Connected to the transistor 43 is a relay circuit consisting of rectifier 46, having relay 47 connected thereacross, resistor 48, transfer contacts 49, 50 under the control of relay 47, capacitor 51.

Pulse generator circuit 6 is identical to pulse generator 5 consisting of transistor 52 having the base and emitter electrodes connected to the slidable contact 35 and the junction point 38 of bridge circuit 20, FIG. 2, by conductors 53, 54, respectively. Connected to the transistor 52 is a relay circuit consisting of rectifier 55 having relay 56 connected thereacross, resistor 57, transfer contacts 58, 59 under the control of relay 56, capacitor 60.

Consider the counting circuits 8, 9, FIG. 4, counting circuit 8 includes a timing circuit consisting, in serial relation, resistor 61, having slidable contact 62 and connected to the open contact 50, FIG. 3, by conductor 63, resistor 64, capacitor 65. Connected across the capacitor 65 is the switch 66.

Also included in this circuit 8, is transistor 67 with the emitter electrode connected to the junction point of reistor 64 and capacitor 65, one leg of the transistor 67 being connected through biasing resistor 68, to the junction point of capacitors 51, 60, FIG. 3, by conductor 69. Relay 70 is connected between the other leg of transistor 67 and capacitor 65, transfer contacts 71, 72 being under the control of this relay 70. Biasing resistor 73 is connected between the open contact 71 and the transistor 67, closed contact 72 being connected to resistor 68.

The counting circuit 9 is identical to the counting circuit 8 which includes a timing circuit consisting, in serial relation, resistor 74, having slidable contact 75 and connected to the open contact 59, FIG. 3, by conductor 76, resistor 77, capacitor 78. Connected across the capacitor 78 is switch 79.

Also included in this circuit 9 is transistor 80 with the emitter electrode connected to the junction point of resistor 77 and capacitor 78, one leg of the transistor 80 being connected, through biasing resistor 81 to the junction point between capacitors 61, 60, FIG. 3, by conductor 69. Relay 82 is connected between the other leg of transistor 80 and the capacitor 78, transfer contacts 83, 84 being under the control of relay 82. Biasing resistor 85 is connected to the open contact 83 and the transistor 80, closed contact 84 being connected to resistor 81.

Consider the indicating circuits, 10, 11, 12, FIG. 5, there is shown in indicating circuit 10 lamp 86 connected between the open contact 71, FIG. 4, by conductor 87 and through relay 70, resistor 73, FIG. 4, by conductor 88. Also shown is energy source 89, having bypass capacitor 90 shunted thereacross, connected between the closed contacts 72, FIG. 4, and the switch 91, the contacts O and T being connected between capacitors 65, 78.

In indicating circuits 11, 12, there is shown lamps 92, 93 connected to the open and closed contacts 83, 84, by conductors 94, 95, respectively, and to the cathode and anode of diode 96.

Figures 6, 7:
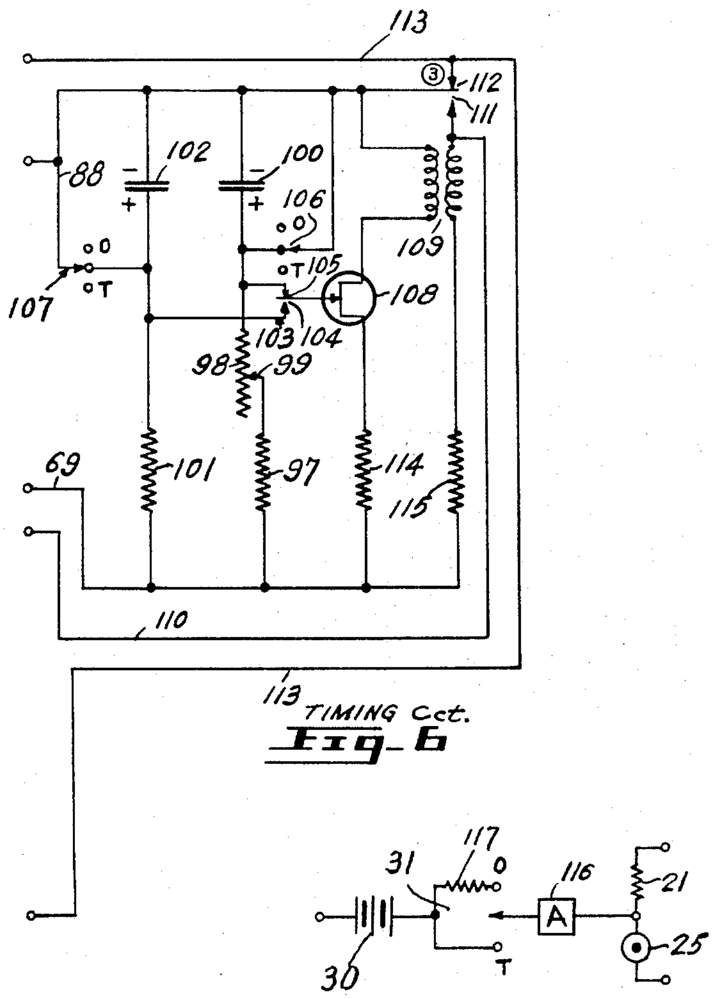
FIG. 6 illustrates the circuit schematic of the timing circuit employed in the service observing system of the invention.
FIG. 7 illustrates a portion of the originating and terminating switching portion of the system.
Figure 8:
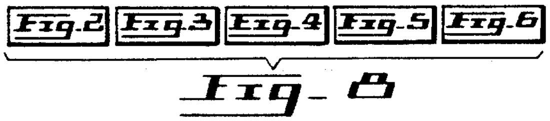
FIG. 8 illustrates the arrangement of the drawings when put together, as shown, forms the service observing system of the invention.

Consider the timing circuit, FIG. 6, there is shown timing circuits consisting of resistor 98, having slidable contact 99, capacitor 100. A second timing circuit consists of resistor 101 and capacitor 102. Switch 103, having transfer contacts 104, 105, are provided so as the timing circuits may be transferred. Also shown is switch 106, connected across the capacitor 100, having contacts O, T, is also provided. The junction point of capacitor 102 and resistor 101 is connected, through switch 107, by conductor 88 to the capacitor 65, FIG. 4. Also shown is transistor 108, having the emitter connected to the switch 103 and the remaining electrodes, through relay 109, to the lamp 92 by conductor 110. Relay 109 is provided with transfer contacts 111, 112, contact 112 being connected to the collector electrode of the pulse generator circuits 43, 52, FIG. 3, by conductor 113. Biasing resistor 114 for transistor 108 and current limiting resistor 115 is also provided.

In FIG. 7, which illustrates the originating and terminating switching portion of the V.U. meters 28, 38, FIG. 2, there is shown amplifier 116 and a pad represented by resistor 117.

Representative values of the resistors and capacitors employed in the system are:

| | | |
|---|---|---|
| Resistors— | | |
| **21, 22, 32, 33** | ohms | 3300 |
| **23, 34** | do | 5000 |
| **48, 57** | do | 4700 |
| **61, 74** | do | 20,000 |
| **64, 77** | do | 10,000 |
| **68, 81** | do | 4700 |
| **73, 85, 114, 115** | do | 4700 |
| **97, 98** | do | 100,000 |
| **101** | do | 82,000 |
| Capacitors— | | |
| **65, 78** | mfd | 50 |
| **51, 60** | mfd | 15 |
| **90** | mfd | 100 |
| **100** | mfd | 100 |
| **102** | mfd | 50 |

*Operation*

In some volume rating systems, the volume indicator is divided into three areas, representative values being:

Good above the 0, V.U. mark
Fair between the 0, V.U. mark and the −6, V.U. mark
Poor below the −6, V.U. mark where V.U. indicates volume units which arbitrarily relate to decible units.

In the service observing system of the invention the speech level is rated:

Good if the movable element 17, FIG. 2, peaks four or more times into the good area in a predetermined time.
Fair if the movable element peaks four or more times into the fair area in a predetermined time.
Poor if the movable element peaks three or less into the fair and into the good areas in a predetermined time.

By the above indicated peaks, an indication is given of the volume characteristic of the transmission by a light source marked poor, fair, good, FIG. 5.

*Adjustment of the system*

The switch with contacts 31, 42, 66, 79, 91, 106, 107 is set to either the originating or terminating party. When the switch is connected to the originating party, the resistor 117, FIG. 7, is inserted in the circuit. When the switch is connected to the terminating party, the resistor 117 is shunted out of the circuit so that the amplification of the system is increased.

When operated, the switch connects batteries 30, 41 and 89 to the circuit, when released the switch disconnects batteries 30, 41 and 89 and short circuits capacitors 65, 78, 100 and 102.

The timing circuit, FIG. 6, sets the timing period within which a series of pulses are counted by the counting circuit, FIG. 3. The timing circuit comprises an RC network made of resistors 97 and 98 and capacitor 100. Capacitor 100 charges over circuit battery 89, contact 91, lead 88, capacitor 100, resistors 98, 97, lead 69, contacts 72, battery 89. Resistor 98 is adjusted to fire unijunction transistor 108 after a predetermined time interval. However when required transistor 108 may be triggered manually by pressing switch 103 to close contacts 104. Switch 103 connects transistor 108 to another RC network made of fixed resistors 101 and capacitor 102. This RC network is set to fire transistor 108 after a fixed period of time which is less than the first predetermined time interval. When capacitors 100 and 102 become charged a sufficient amount, transistor 108 conducts causing relay 109 to operate. When relay 109 operates, contacts 112 open causing deenergization of conductor 113.

Resistors 23 and 24, FIG. 2, are adjusted in order to balance the bridge circuits 2, 3.

*Ratings*

*Good.*—When the light shutter 17 is deflected into the good zone, the good bridge circuit 19 becomes unbalanced since the impedance of the photo conductive device 26 increases in view of some of the light from window 11 being cut off by the shutter 17 as the shutter enters the good zone.

The unbalancing of the bridge circuit 19 triggers transistor 43 over the circuit, junction point 27, FIG. 2, 44–base electrode, transistor 43–emitter electrode, transistor 43–45–junction point 23, 24. When transistor 43 conducts the circuit, battery 89, contacts 91, lead 88, contacts 112, lead 113, transistor 43, relay 47, resistor 48, conductors 69, contacts 72, battery 89 is completed so that relay 47 operates closing contacts 63. Since the light received through window 14, 15 is the same at this time, bridge circuit 20 remains balanced.

As the opening and closing of the transfer contact 50, FIG. 3, follows the conduction and nonconduction of the transistor 43 as the light shutter enters and re-enters the good zone, FIG. 2, a pulse is transmitted.

When the contacts 63, FIG. 3, close, the circuit, battery 89, lead 88, capacitor 65, resistor 64, resistor 61, contacts 62, contacts 63, lead 69, contacts 72, battery 89 is completed so that capacitor 65 progressively charges by the pulses applied thereto.

When the charging circuit for capacitor 65, FIG. 3, has allowed this capacitor 65 to be sufficiently charged in a specific time controlled by the timing circuit transistor 67 conducts allowing relay 70 to operate so as to close contacts 71. When contacts 71 close, lamp 86 is activated. The closure of contacts 71 also disconnects battery 89 from conductor 69 and prevents further energization of the counting circuit associated with bridge circuit 20.

*Fair.*—When the movable member 18 passes from the poor to the fair zone, the impedance of the photo conductive device 37 decreases so as to unbalance the bridge circuit 20 thus causing photo conductive device 52 to conduct. As described with respect to pulse generator circuit 5, a positive pulse is applied to the timing networks 74, 77, 78.

When four pulses have been impressed on capacitor 78, in a specific time as controlled by the timing circuit 7, relay 82 operates closing contacts 83. When contacts 111 close at the end of the timing period, the circuit 89–72–83–93–96–110–111–112–88–89 is completed energizing lamp 93. The timing circuit, FIG. 6, also disconnects the transistors 43, at contact 111 thus preventing subsequent energization of the good lamp 86.

*Poor.*—If the light shutter 17 does not move out of the window 15, or if the number of pulses derived from the bridge circuit 20 is less than four, the counting circuit 9 does not energize. The timing circuit energizes relay 109 at the end of the timing period and contacts 112 are closed. Lamp 92 is therefore energized over the circuit 89–88–111–110–92–95–84–72–89. Timing circuit 7 when energized prevents subsequent pulses from turning on the good and fair lamps by opening contacts 112.

The embodiments of the invention in which an exclusive property or privilege is claimed are defined as follows:

1. A telephone service observing system for indicating the quality of transmission over a telephone line comprising:
- (a) a meter having a needle movable in response to transmission over the telephone line;
- (b) light sensitive means positioned in the path of said needle at a point corresponding to a particular quality of transmission; and
- (c) means responsive to a predetermined number of passages of said needle by said light sensitive means during a predetermined period of time for indicating said particular quality of transmission.

2. A telephone service observing system as defined in claim 1 wherein said responsive means includes a bridge circuit having said light sensitive means therein, said bridge circuit becoming unbalanced in response to a reduction in light of the light sensitive means when the needle passes thereby.

3. A telephone service observing system as defined in claim 2 wherein said responsive means includes a pulse generator responsive during said predetermined period of time to unbalance of the bridge circuit for generating a pulse upon each passage of said needle by said light sensitive means.

4. A telephone service observing system as defined in claim 3 wherein said responsive means includes a timing means for determining said predetermined period of time during which said pulse generator is responsive to said bridge circuit.

5. A telephone service observing system for indicating the quality of transmission over a telephone line comprising:
- (a) a meter having a needle movable in response to transmission over the telephone line;
- (b) light sensitive means positioned in the path of said needle at a point corresponding to a particular quality of transmission;
- (c) means for registering responses of said light sensitive means to passage of the needle thereby during a predetermined time interval; and
- (d) means responsive to the registration of a predetermined number of responses of the light sensitive means during said time interval to indicate said particular quality of transmission.

6. A telephone service observing system as defined in claim 5 wherein said registering means includes a bridge circuit having said light sensitive means therein, said bridge circuit becoming unbalanced in response to a reduction in light to the light sensitive means when the needle passes thereby.

7. A telephone service observing system as defined in claim 6 wherein said registering means includes a pulse generator responsive during said predetermined period of time to unbalance of the bridge circuit for generating a pulse upon each passage of said needle by said light sensitive means.

8. A telephone service observing system for indicating the quality of transmission over a telephone line comprising:
- (a) a meter having a needle movable in response to transmission over the telephone line;
- (b) a light sensitive means positioned in the path of said needle at a point corresponding to a particular quality of transmission;
- (c) a bridge circuit including said light sensitive means and responsive to a reduction in light to the light sensitive means when the needle passes thereby;
- (d) a pulse generator responsive to unbalance of the bridge circuit for generating a pulse upon each passage of said needle by said light sensitive means;
- (e) a timing means for determining the period of time during which said pulse generator is responsive to said bridge circuit;
- (f) a counting means for storing the pulses generated by said pulse generator; and
- (g) an indicating means responsive to the number of pulses stored by said counting means for giving an indication of the quality of transmission over the telephone line.

9. A telephone service observing system as defined in claim 8 wherein said meter includes a dial having a window behind which is positioned said light sensitive means, said dial having a second window adjacent the first window and out of the path of the needle, a second light sensitive means positioned behind said second window, said second light sensitive means being included in said bridge circuit and acting as a reference device.

10. A telephone service observing system as defined in claim 8 wherein the counting means comprises a transistor circuit including a relay and a capacitor capable of storing the pulses generated by said pulse generator until the potential accumulated on the capacitor is sufficient to trigger said transistor to operate said relay, the operation of the relay causing energization of the indicating means.

11. A telephone service observing system for indicating the quality of transmission over a telephone line comprising:
- (a) a meter having a needle movable in response to transmission over the telephone line;

(b) a first and a second light sensitive means positioned in the path of said needle at separate points corresponding to two particular qualities of transmission, each light sensitive means having:

(1) means for registering the number of responses of the respective light sensitive means to passage of said needle thereby during a predetermined time interval and (2) means responsive to the registering means for indicating a particular quality of transmission when the needle passes in front of the respective sensitive means more than a predetermined number of times during the predetermined time interval, one of said indicating means being energized only at the completion of the time interval;

(c) a further indicating means responsive to passage of the needle in front of either light sensitive means less than said predetermined number of times during said predetermined time interval.

12. A telephone service observing system as defined in claim 11 wherein each registering means includes a bridge circuit having its respective light sensitive means therein, said bridge circuit becoming unbalanced in response to a reduction of light to the light sensitive means when the needle passes thereby.

13. A telephone service observing system as defined in claim 12 wherein each registering means includes a pulse generator responsive during said predetermined time interval to unbalance of the associated bridge circuit for generating a pulse upon each passage of said needle by said light sensitive means.

14. A telephone service observing system for indicating the quality of transmission over a telephone line comprising:

(a) a meter having a needle movable in response to transmission over the telephone line;

(b) a first and a second light sensitive means positioned in the path of said needle at separate points corresponding to two particular qualities of transmission, each light sensitive means having:

(1) a bridge circuit including the respective light sensitive means and responsive to a reduction in light to the light sensitive means when the needle passes thereover; and (2) a pulse generator responsive to unbalance of its associated bridge circuit for generating a pulse;

(c) a timing means for determining the period of time during which both pulse generators are responsive to their respective bridge circuits;

(d) each light sensitive means further having:

(1) means for counting the pulses generated by the respective pulse generator; and (2) means responsive to each counting means for indicating a particular quality of transmission when the needle passes in front of the associated light sensitive means more than a predetermined number of times during the predetermined period of time, one of the indicating means being further responsive to the timing means at the completion of the predetermined period of time;

(e) a further indicating means responsive to the timing means at the end of the timing period when the needle passes in front of either light sensitive means less than a predetermined number of times during the predetermined time period.

15. A telephone service observing system as defined in claim 14 wherein said meter includes a dial having a first and a second window behind which are positioned said first and second light sensitive means respectively, said dial having a further window adjacent each of the first and second windows and out of the path of the needle, a further light sensitive means positioned behind said further window, each said further light sensitive means being included in its respective bridge circuit and acting as a reference device.

16. A telephone service observing system as defined in claim 14 including a common power source energizing said pulse generators, said timing means, said counting means and said indicating means.

17. A telephone service observing system as defined in claim 16 wherein each counting means comprises a transistor circuit including a relay and a capacitor capable of storing the pulses generated by the respective pulse generator until the potential accumulated on the capacitor is sufficient to trigger the transistor to operate the relay.

18. A telephone service observing system as defined in claim 17 wherein the relay of the counting means associated with the first light sensitive means has a set of contacts which when operated connects its associated indicating means to said source of power and also disconnects the counting means associated with the second light sensitive means from said source of power.

19. A telephone service observing system as defined in claim 17 wherein the relay of the counting means associated with the second light sensitive means has a set of contacts which when operated connects its associated indicating means to one terminal of said source of power.

20. A telephone service observing system as defined in claim 19 wherein said timing means comprises a transistor circuit including a relay and a variable R.C. network controlling the conduction of the transistor and consequently the energization of the relay, said last-mentioned relay having a set of contacts which when operated causes connection of the indicating means associated with the second light sensitive means to the other terminal of said source of power thereby completing its energization path.

21. A telephone service observing system as defined in claim 20 wherein operation of the contacts of said last-mentioned relay connects the further indicating means to said source of power when the needle passes in front of said first or second light sensitive means less than a predetermined number of times during the predetermined time period.

22. A telephone service observing system as defined in claim 20 wherein operation of the contacts of said last-mentioned relay disconnects said pulse generators from the source of power thereby terminating the timing period.

References Cited

UNITED STATES PATENTS 2,066,942 1/1937 Massa.

WILLIAM C. COOPER, *Primary Examiner.*

ARTHUR A. McGILL, *Assistant Examiner.*

U.S. Cl. X.R.

250—215